(12) United States Patent
Liberge et al.

(10) Patent No.: US 8,061,192 B2
(45) Date of Patent: Nov. 22, 2011

(54) UNIT FOR MEASURING AND SYSTEM FOR MONITORING TIRE PRESSURE IN TIRES OF THE EXTENDED MOBILITY OR OTHER TYPE

(75) Inventors: Franck Liberge, Durtol (FR); Philippe Corniot, Enval (FR)

(73) Assignees: Societe de Technologie Michelin, Clermont-Ferrand (FR); Michelin Recherche et Technique, S.A., Granges-Paccot (CH)

(*) Notice: Subject to any disclaimer, the term of this patent is extended or adjusted under 35 U.S.C. 154(b) by 63 days.

(21) Appl. No.: 12/532,345

(22) PCT Filed: Mar. 18, 2008

(86) PCT No.: PCT/EP2008/053219
§ 371 (c)(1),
(2), (4) Date: Oct. 21, 2009

(87) PCT Pub. No.: WO2008/125411
PCT Pub. Date: Oct. 23, 2008

(65) Prior Publication Data
US 2010/0288039 A1     Nov. 18, 2010

(30) Foreign Application Priority Data

Mar. 22, 2007 (FR) .................................. 07 02098

(51) Int. Cl.
*B60C 23/02* (2006.01)
(52) U.S. Cl. .................... 73/146.5; 340/445; 340/447
(58) Field of Classification Search .................. None
See application file for complete search history.

(56) References Cited

U.S. PATENT DOCUMENTS

| 6,087,930 | A | 7/2000 | Kulka et al. .................... 340/447 |
| 2007/0247294 | A1 | 10/2007 | Baader et al. ................. 340/445 |

FOREIGN PATENT DOCUMENTS

| DE | 103 19 092 A1 | 11/2004 |
| DE | 103 58 105 A1 | 7/2005 |
| EP | 11 107 64 A2 | 6/2001 |
| WO | WO 02/07993 A2 | 1/2002 |

*Primary Examiner* — Andre Allen
(74) *Attorney, Agent, or Firm* — Fitzpatrick, Cella, Harper & Scinto

(57) ABSTRACT

Measuring unit with at least a pressure sensor and signal transmission means, intended to be fitted on a tire/wheel assembly, characterized in that it comprises a logic indicator with two states, active and inactive, and in that the logic indicator becomes active each time the pressure measured by the pressure sensor is below a given threshold, close to zero.

15 Claims, 5 Drawing Sheets

UNIT FOR MEASURING AND SYSTEM FOR MONITORING TIRE PRESSURE IN TIRES OF THE EXTENDED MOBILITY OR OTHER TYPE

FIELD OF THE INVENTION

The subject of the invention is a unit for measuring and a system for monitoring the pressure of tires of a vehicle which are suitable for extended mobility and standard tires.

TECHNOLOGICAL BACKGROUND

Monitoring systems for vehicles fitted with standard tires are in very widespread use. These systems usually warn the driver of the vehicle when the pressure of one of the tires drops below a given threshold relative to the recommended inflation pressures.

For a few years, tire manufacturers have been developing solutions making it possible to run with the same tire, according to certain limits that have to be observed, after a puncture or a drop in pressure. This makes it possible, for example, to get to a repair point without having to stop, in circumstances that are often hazardous, to fit the spare wheel. These tire solutions are known as "extended mobility tires".

Two broad types of technologies for extended mobility are now emerging on the motor vehicle market. On the one hand, there are self-supporting tires, often designated "zero pressure" (ZP) tires. The self-supporting tires are capable of supporting a load at reduced pressure, even no pressure, thanks to their reinforced side walls, more often than not by means of inserts made of rubbery material provided in the side walls.

On the other hand, there are wheels fitted with supports, capable of supporting the inside of the tread of a tire in the event of a weakening of the side walls following a drop in pressure. This solution is advantageously coupled with a tire comprising a bottom area capable of minimizing the risk of the tire slipping off the rim. This solution is advantageous since it makes it possible to keep the running characteristics substantially intact in normal conditions. On the other hand, it entails the drawback of requiring an additional piece, the support, for each of the wheels of the vehicle.

For all vehicles fitted with extended mobility tires, a pressure monitoring system is mandatory to be able to warn the driver of the vehicle of a loss of pressure and that a tire is beginning to operate in extended mode. The driver then knows that he must limit his speed and that his running autonomy is limited. Some monitoring systems are designed to manage the remaining autonomy.

At the present time, the measuring units usually used in the pressure monitoring systems are not physically attached to the tire itself, but are fixed behind the wheel valves. Thus, after a tire and wheel assembly has been removed, it is no longer possible to guarantee a relationship between the identification code of the measuring unit and the type of tire fitted.

Another problem arises when the driver of the vehicle decides to replace one or more of the extended mobility tires with standard tires. The monitoring system of the extended mobility tires of the vehicle risks no longer being suitable for monitoring standard tires. In such a case, how can the monitoring system be notified of the change of tire type?

DESCRIPTION OF THE INVENTION

The subject of the invention is a measuring unit of a system for monitoring the pressure of the tires of a vehicle with at least a pressure sensor and signal transmission means and intended to be fitted on a tire/wheel assembly. This measuring unit is characterized in that it comprises a logic indicator with two states, active and inactive, and in that the logic indicator becomes active each time the pressure measured by the pressure sensor is below a given threshold, close to zero.

The pressure measured by the pressure sensor is a relative value and not an absolute value. When this pressure is close to zero, it means that the measured pressure is close to the atmospheric pressure.

Preferably, the pressure threshold is 100 mbar and very preferably 200 mbar.

The logic indicator according to the invention becomes active each time the pressure becomes zero or almost zero. This occurs in two situations: when the tire/wheel assembly is removed or in the event of a puncture leading to a complete or almost complete deflation of the tire. In the latter case, there can still be a residual relative pressure inside the tire of the order of 100 to 150 mbar. However, this residual pressure would not under any circumstances allow a standard tire (without extended mobility) to fulfill its function; any attempt to run in these conditions would be to run flat with the risk of very rapidly causing irreparable damage to the tire. Consequently, the activation of the logic indicator has the advantage of recording that a removal or a puncture with complete deflation of the tire has taken place and that the tire concerned should be checked, to check its type if there has been a removal, or its state after running flat or in extended mode.

Preferably, the measuring unit is designed to transmit an alert message to a central unit when the logic indicator is active. This makes it possible not to wait for the next service to check and, if necessary, correct the operation of the monitoring system and the state of the tires of the vehicle.

Advantageously, the logic indicator of the measuring unit can be returned to the inactive state by a diagnostic tool.

The activation of the logic indicator makes it possible to detect removals and to force the use of a diagnostic tool to reinitialize the monitoring system and the wheel module in order to guarantee that an expert equipped with such a tool has inspected the tire before re-inflating it.

According to a preferred embodiment, this measuring unit is also capable of storing and transmitting to a central unit an additional code dependent on the type of tire of the tire/wheel assembly.

Another subject of the invention is a system for monitoring the pressure of a tire of a vehicle comprising a central unit with a receiver and processing means, and a measuring unit arranged inside the tire/wheel assembly with a pressure sensor and signal transmission means. This system is characterized in that the measuring unit comprises a logic indicator with two states, active and inactive, and in that the logic indicator becomes active each time the pressure measured by the pressure sensor is below a given threshold, close to zero.

Advantageously, the measuring unit is capable of storing and transmitting to the central unit an additional code dependent on the type of tire of the tire/wheel assembly.

Preferably, the processing means of the central unit have a plurality of programs for processing data transmitted by the measuring unit and each data processing program is suited to a given type of tire.

Advantageously, the signals comprising the additional code can be transmitted by the measuring unit. This makes it possible at all times in the life of the vehicle to inform the central unit of a change of tire type and to make it possible for this central unit to use the appropriate monitoring program. The signals comprising the additional code can also be transmitted by a diagnostic tool.

The central unit can thus permanently check the compatibility between its tire pressure monitoring mode and the type of tires monitored. In particular, if a tire/wheel assembly with extended mobility is replaced with a standard tire/wheel assembly, without activation of a logic indicator, the central unit is immediately notified and this allows for an automatic switchover from one program to another, for example from one monitoring mode for tires with extended mobility to a monitoring mode for standard tires, without requiring any intervention by a tire or vehicle expert.

Preferably, the additional code of the measuring unit is entered into and can be modified in the measuring unit by means of a diagnostic tool.

This enables the expert who first fits a measuring unit on a tire/wheel assembly to enter the code corresponding to the type of tire, then subsequently, should this type of tire be changed, to modify the code entered in the measuring unit.

The type of tires can advantageously be chosen from the group of tires with extended mobility and standard tires; it is also possible to choose from the group of "summer" tires and "winter" tires. It should in fact be noted that, in the latter case, the limit speeds of the winter tires are often less than those of the summer tires type-approved for the same vehicle. It is consequently very useful to inform the central unit of this and adapt the monitoring program.

For each of the tire types defined, in case of incompatibility, the switchover can be automatic.

BRIEF DESCRIPTION OF THE DRAWINGS

Other features and benefits of the invention will emerge from the description given hereinbelow with reference to the appended drawings which show, by way of nonlimiting examples, embodiments of the subject of the invention.

DETAILED DESCRIPTION OF EMBODIMENTS OF THE INVENTION

Figure 1:
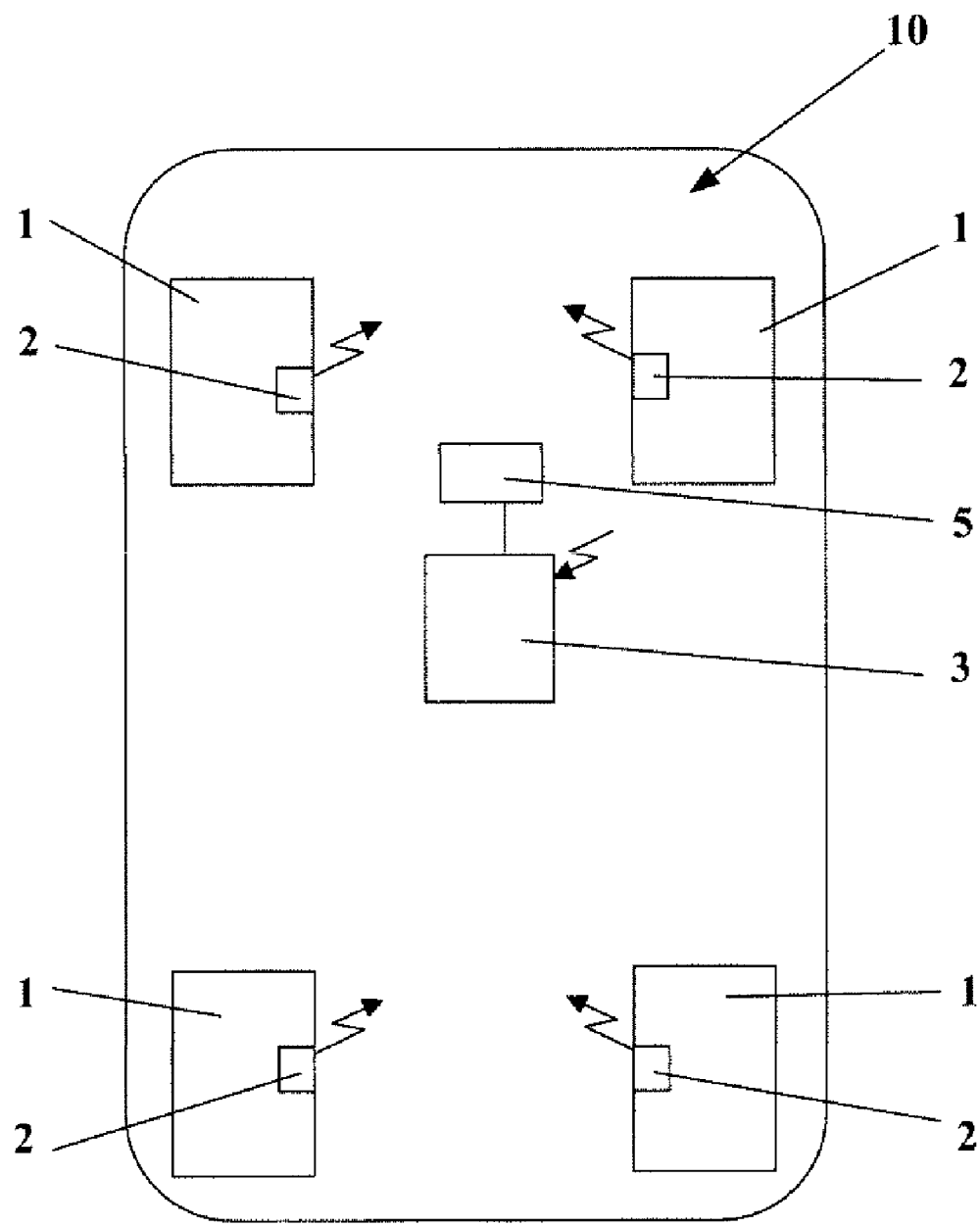
FIG. 1 diagrammatically shows a vehicle fitted with a tire pressure monitoring system.

FIG. 1 diagrammatically shows the layout in a vehicle 10 with two axles and four wheels of a tire monitoring system according to the invention. The vehicle has four tire/wheel assemblies 1. The tire monitoring system comprises a measuring unit 2 arranged inside the internal cavity of each tire 1 and in particular equipped with a radio transmitter and pressure and temperature sensors, a central unit 3 and a readout 5. The central unit 3 is arranged inside the vehicle, for example under the chassis, and the readout 5 is placed inside the passenger compartment. The central unit 3 is equipped with a radio reception and/or transmission subsystem.

Figure 2:
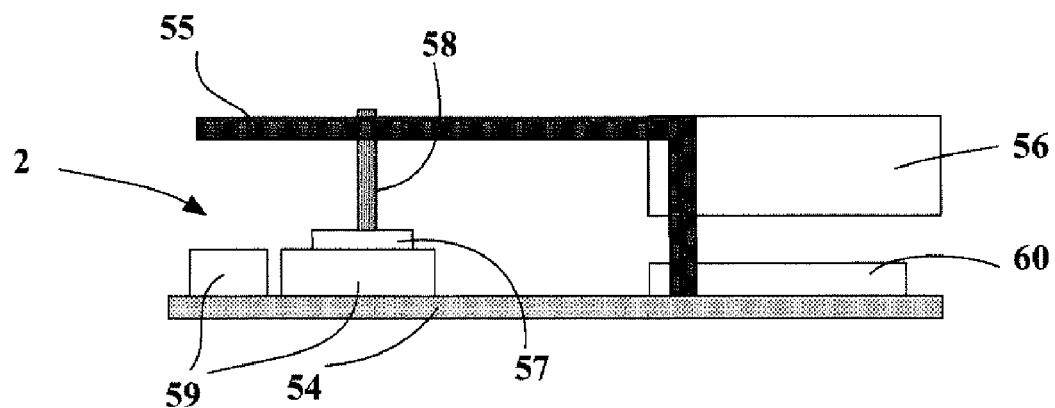
FIGS. 2 and 3 diagrammatically show a measuring unit according to the invention.
Figure 3:
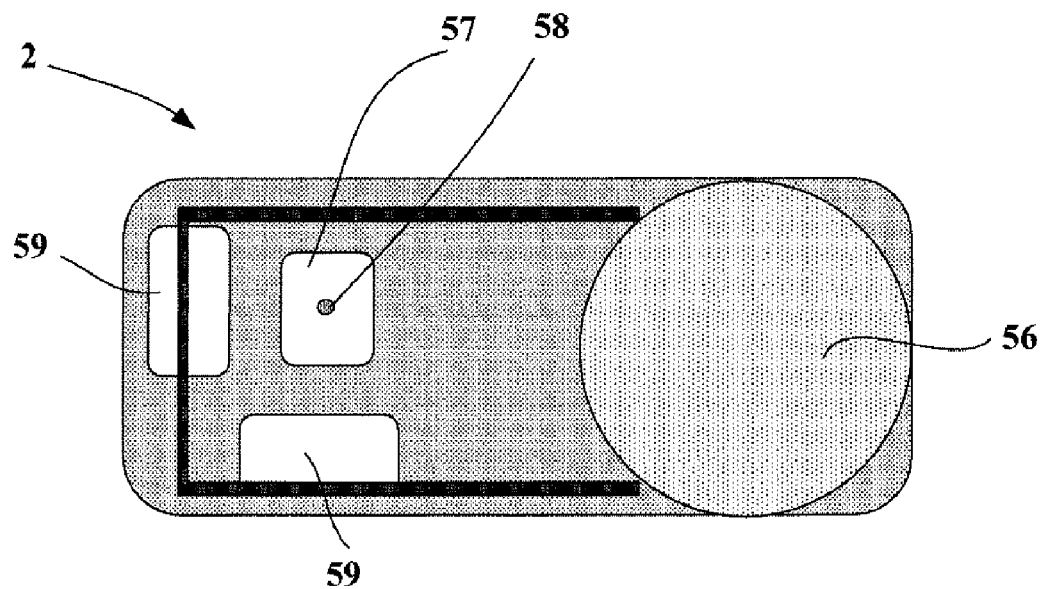

FIGS. 2 and 3 show a side view and a plan view of a measuring unit 2 according to the invention. These two views show the main electronic elements that make up the measuring unit before their incorporation in a packaging such as a casing or coating resin.

This exemplary measuring unit 2 comprises an electronic component support PCB 54, a UHF transmission antenna 55, a pressure sensor 57 with a cylindrical chimney 58 intended to bring the sensitive part of the sensor 57 into fluid communication with the tire cavity defined by the tire and the rim, a battery 56, two LF reception antennas 59 and a number of other components 60 such as the HF transmitter and a microprocessor for processing the data and signals received and transmitted.

The microprocessor is designed to generate and transmit to the central unit 3 signals usually comprising an identification code specific to each unit and the measurement data.

According to a first embodiment of a measuring unit 2 according to the invention, the microprocessor of the measuring unit 2 includes a logic indicator which is activated immediately the pressure sensor 57 detects an almost zero pressure. When the logic indicator is activated, this activation is also transmitted to the central unit.

A diagnostic tool can be used to deactivate the logic indicator.

According to a second embodiment of the invention, the measuring unit includes a memory designed to store an additional code dependent on the type of tire that is fitted with the measuring unit. This additional code is also transmitted by the measuring unit. The diagnostic tool can be used to modify the additional code.

Such a diagnostic tool allows direct or indirect dialogue with measuring units such as the unit 2. The tool in particular makes it possible to identify the identification codes of the measuring units, to view the measurement results, perform unit test program adjustments, etc. An exemplary diagnostic tool is the VT60 marketed by ATEQ. This tool dialogues directly by radio with the measuring units. Another exemplary diagnostic tool is a PC connected to the diagnostic socket of the vehicle. This PC can perform all the above operations via this diagnostic socket and the central unit of the monitoring system. It is then the central unit that transmits a particular radio command to the measuring unit.

The measuring unit 2 is usually fixed behind a valve intended to be fitted on the wheel.

Figure 4:
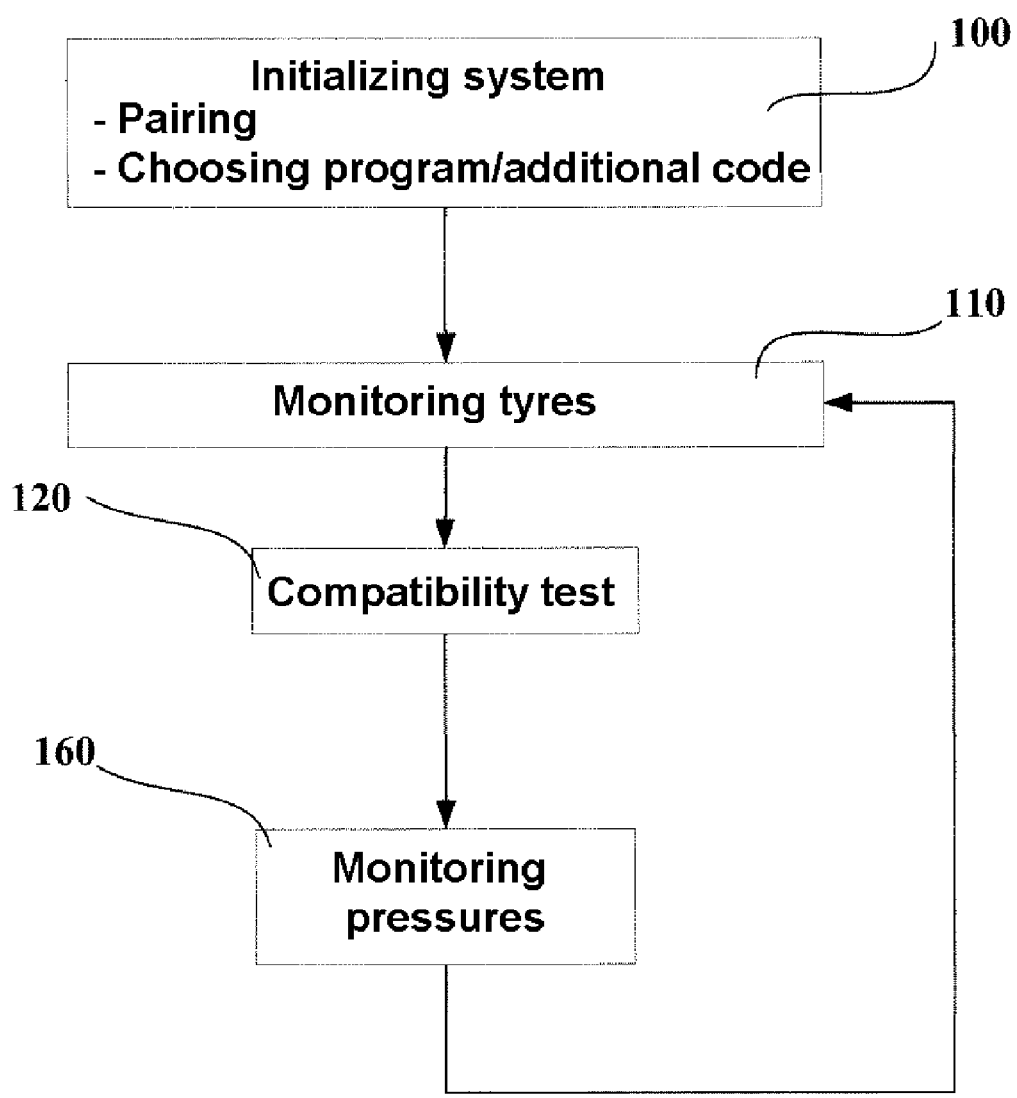
FIG. 4 is a general flow diagram of one implementation of the invention.

FIG. 4 shows a general and simplified flow diagram of an implementation of a monitoring system according to the invention.

In this implementation, the central unit comprises a plurality of data processing programs and is designed to receive and process signals including an additional code transmitted by a diagnostic tool and each measuring unit includes a logic indicator with two states, active and inactive, activated when the measurement of a pressure becomes close to zero.

The step 100 corresponds to the step of first initialization of the system in the vehicle. This first initialization is usually performed at the end of the vehicle assembly lines. The pairing phase is one in which each measuring unit is assigned a determined position of the vehicle and this assignment is stored in the central unit's memory. This pairing can be done automatically or not. The phase of choosing the data processing program of the central unit corresponds to choosing the processing program according to the type of tires fitted on the vehicle, for example four tires with extended mobility.

In the step 110, the system is put into operation when the vehicle is started up. It should be noted that certain elements of the tire pressure monitoring system are perfectly capable of operating continuously from their first activation in the factory.

The invention consists in adding to or complementing the usual monitoring mode with a multiple compatibility test, step 120, before performing the step 160 for checking the tire pressures.

Figure 5:
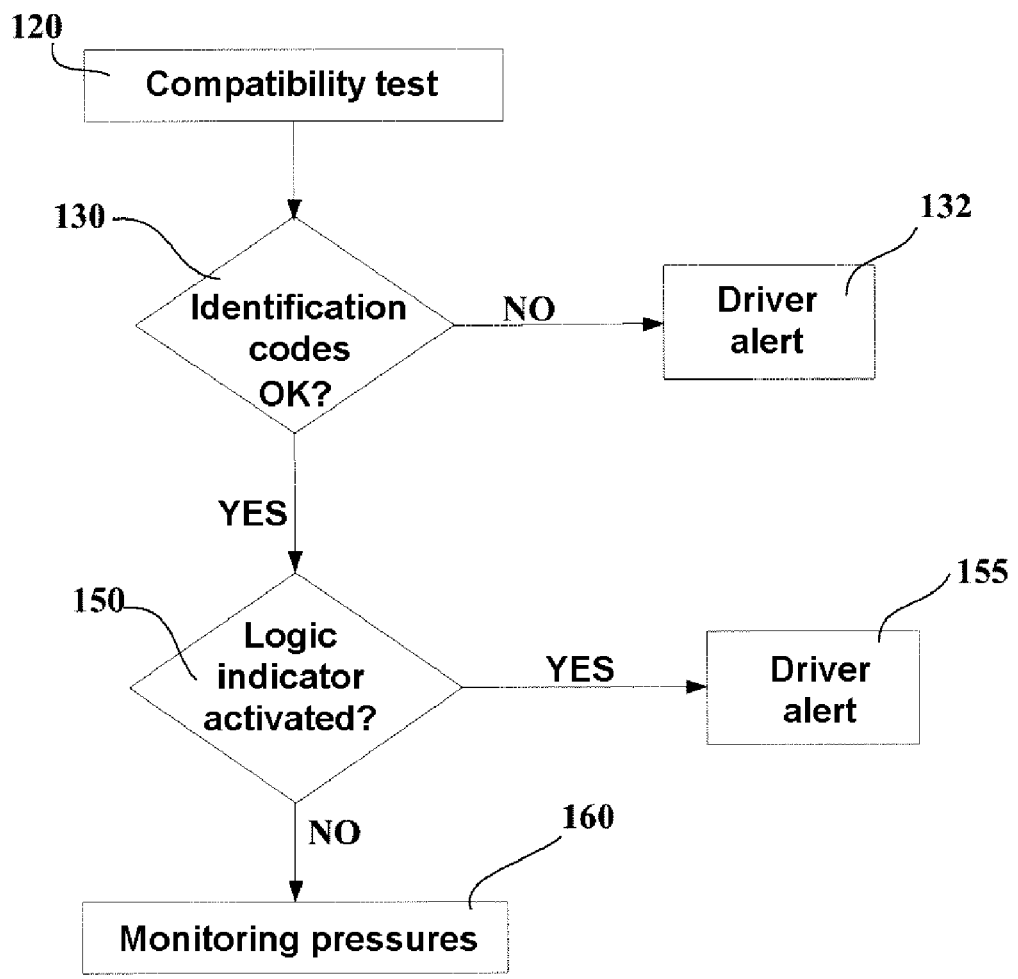
FIG. 5 is a simplified flow diagram of a first implementation of the invention.

FIG. 5 illustrates the compatibility test in the case of a first implementation of the invention. In this first implementation, the central unit is designed to receive and process signals including an additional code linked to the type of tires fitted and originating from a diagnostic tool.

This compatibility test 120 begins with a check of the identification codes received from the measuring units against those stored in the central unit, step 130. If the result is negative, this means that at least one of the measuring units has been changed, that is, that a tire or a tire/wheel assembly has been changed; this can also indicate a measuring unit operating fault.

A driver alert 132 is then triggered to ask the driver to have the operation of the system and his tires checked to be certain that the tire/wheel assembly that has replaced at least one of the initial assemblies is indeed of the same type and, if not, to transmit to the central unit the additional code corresponding to the new assembly by means of a diagnostic tool.

After the step 130, if the codes are correct, the test continues with the step 150 to check whether the logic indicator of one of the measuring units is activated or not.

In the case of a loss of pressure from a puncture or any other cause, this means having run in extended mode without an expert having checked the correct state of the tires after such running.

This can also indicate that the tire concerned has been removed then the same tire or another has been refitted but again without an expert having validated the operation. The term "expert" should be understood to mean a tire trader or a garage technician.

In both cases, the system can no longer be certain of the correct physical state of the tires or of the compatibility of the tires with the monitoring program, and the central unit sends an alert to the driver urging him to check his tires as soon as possible, step 155.

On completion of the step 150, or 155 if appropriate, the system analyses in the usual way the data received from the measuring unit to determine whether the inflation pressures are satisfactory or not, step 160.

Figure 6:
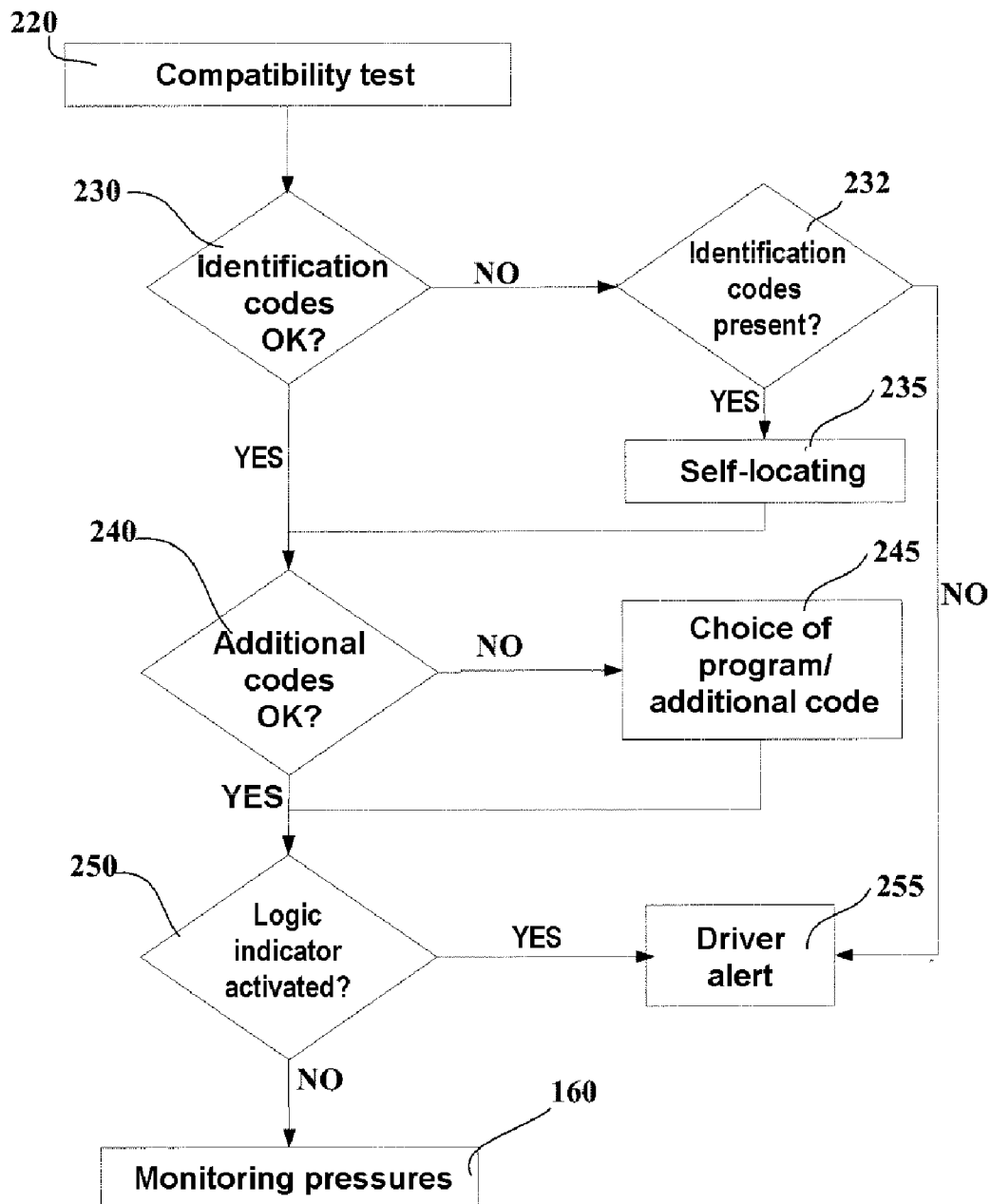
FIG. 6 is a simplified flow diagram of a second implementation of the invention.

FIG. 6 shows the compatibility test in the case of a second embodiment of the invention in which the measuring unit is also designed to store and transmit to the central unit an additional code dependent on the type of tire fitted on the tire/wheel assembly that it is monitoring. This test also takes into consideration the preferred case in which the pairing or locating of the identification codes of the measuring units in the central unit is performed automatically without intervention either of the driver or of a garage technician. The step is then referred to as "self-locating".

The compatibility test 220 begins as previously with the verification of the identification codes of the measuring units against the codes stored in the central unit (step 230).

If there is a discrepancy, the reception of a code by each tire is tested in the step 232.

If all the codes are received, the self-locating step (step 235) is launched and the central unit stores in memory the new identification codes received.

If at least one identification code is absent, this indicates that one of the measuring units is absent or defective and a driver alert is issued (step 255).

After the step 230 or 235, the conformity of the additional codes transmitted continuously by the measuring units with the additional codes stored in the central unit is tested in the step 240.

If the test is negative, the central unit switches over automatically, for the tire or tires concerned, to the received data processing program suited to the tire actually fitted on the vehicle (step 245).

After the step 240 or 245 if appropriate, the test 220 is continued in the step 250 to check whether the logic indicator of one of the measuring units is activated or not. Also, if one of the measuring units has its logic indicator activated, a driver alert is issued (step 255).

The checking of the tires then continues in the step 160.

The fact that the measuring unit stores and transmits to the central unit this additional code giving the type of tire being monitored, enables this central unit to check continuously the compatibility between the types of tires and the associated monitoring programs.

This embodiment has the advantage, in the case where one or more complete tire/wheel assemblies have been replaced by the driver, for example replaced with standard or conventional snow tires (without extended mobility), of automatically determining in the step 230 the presence of four new identification codes, launching the self-locating program (step 235 of FIG. 5) to assign and store for each position the appropriate identification code and enable the central unit to detect whether these additional codes are different (step 240) and switch over automatically (step 245) to the monitoring programs suited to the winter tires fitted without having to ask the driver to have his tires checked.

This implementation of the invention has the advantage of requiring the driver of the vehicle to go to an expert to have his tires and/or the monitoring system checked only when truly necessary.

The invention is not limited to the examples described and represented, and various modifications can be made thereto without departing from its framework defined by the appended claims.

The invention claimed is:

1. A measuring unit to be fitted on a tire/wheel assembly installed in a vehicle, comprising:
    a pressure sensor;
    a signal transmitter; and
    a logic indicator with two states: active and inactive,
        wherein the logic indicator enters the active state each time the pressure sensor measures a tire pressure below a given threshold,
        wherein the given threshold is close to zero, indicating that the tire pressure is close to atmospheric pressure,
        wherein, when the logic indicator is in the active state, a signal is transmitted by the signal transmitter, and
        wherein the logic indicator is operational when the vehicle is started up.

2. The measuring unit according to claim 1, wherein the given threshold is equal to 100 mbar.

3. The measuring unit according to claim 1, wherein the given threshold is equal to 200 mbar.

4. The measuring unit according to claim 1, wherein the signal transmitter transmits an alert message to a central unit when the logic indicator is in the active state.

5. The measuring unit according to claim 1, wherein the logic indicator is returned to the inactive state from the active state by a diagnostic tool.

6. The measuring unit according to claim 1, further comprising a memory for storing an additional code dependent on a type of tire of the tire/wheel assembly, wherein the signal transmitter transmits the additional code to a central unit when the logic indicator is in the active state.

7. A system for monitoring pressure in a tire of a vehicle, the system comprising:
    a central unit with a receiver and a processor, and
    a measuring unit that includes:
        a pressure sensor,
        a signal transmitter, and a logic indicator with two states: active and inactive,
wherein the logic indicator enters the active state each time the pressure sensor measures a tire pressure below a given threshold,
wherein the given threshold is close to zero, indicating that the tire pressure is close to atmospheric pressure,
wherein, when the logic indicator is in the active state, a signal is transmitted by the signal transmitter to the central unit, and
wherein the logic indicator is operational when the vehicle is started up.

8. The system according to claim 7,
wherein the processor of the central unit includes a plurality of data processing programs for processing data transmitted by the measuring unit, and
wherein each data processing program is suited to a given type of tire.

9. The system according to claim 7, wherein the central unit receives a signal of an additional code transmitted by a diagnostic tool, the additional code corresponding to a type of the tire of the vehicle.

10. System according to claim 7, wherein the measuring unit transmits a signal of an additional code to the central unit, the additional code corresponding to a type of the tire of the vehicle.

11. The system according to claim 10, wherein the additional code is stored by the measuring unit and is modifiable by a diagnostic tool.

12. The system according to claim 9, wherein a type of the tire is chosen from a group of tires that includes extended mobility tires and standard tires.

13. The system according to claim 9, wherein the type of the tire is chosen from a group of tires that includes "summer" tires and "winter" tires.

14. The system according to claim 10, wherein a type of the tire is chosen from a group of tires that includes extended mobility tires and standard tires.

15. The system according to claim 10, wherein the type of the tire is chosen from a group of tires that includes "summer" tires and "winter" tires.

* * * * *

UNITED STATES PATENT AND TRADEMARK OFFICE
CERTIFICATE OF CORRECTION

PATENT NO. : 8,061,192 B2
APPLICATION NO. : 12/532345
DATED : November 15, 2011
INVENTOR(S) : Franck Liberge et al.

Page 1 of 1

It is certified that error appears in the above-identified patent and that said Letters Patent is hereby corrected as shown below:

COLUMN 3

Line 22, "limit speeds" should read --speed limits--.

COLUMN 5

Line 26, "removed then" should read --removed, then--.
Line 26, "refitted but" should read --refitted, but--.

COLUMN 8

Line 1, "System" should read --The system--.

Signed and Sealed this
Tenth Day of April, 2012

David J. Kappos
*Director of the United States Patent and Trademark Office*